(12) United States Patent
Wang et al.

(10) Patent No.: US 6,600,637 B1
(45) Date of Patent: Jul. 29, 2003

(54) EDGE BARRIER TO PREVENT SPIN VALVE SENSOR CORROSION AND IMPROVE LONG TERM RELIABILITY

(75) Inventors: Hong Wang, Savage, MN (US); Robbee L. Grimm, Lakeville, MN (US); Matthew T. Johnson, Roseville, MN (US); John P. Spangler, Burnsville, MN (US); Craig A. Ballentine, Bloomington, MN (US); Qing He, Bloomington, MN (US); Steven C. Riemer, Minneapolis, MN (US); Brian J. Daniels, Eagan, MN (US)

(73) Assignee: Seagate Technology, L.L.C., Scotts Valley, CA (US)

( * ) Notice: Subject to any disclaimer, the term of this patent is extended or adjusted under 35 U.S.C. 154(b) by 0 days.

(21) Appl. No.: 09/541,218

(22) Filed: Apr. 3, 2000

Related U.S. Application Data (60) Provisional application No. 60/162,612, filed on Oct. 28, 1999.

(51) Int. Cl.[7] ............................................... G11B 5/127
(52) U.S. Cl. ......................................................... 360/324
(58) Field of Search .................................. 360/324, 315, 360/327.32, 235.2; 324/324, 252; 365/158, 173

(56) References Cited

U.S. PATENT DOCUMENTS

| | | | | |
|---|---|---|---|---|
| 4,755,897 A | * | 7/1988 | Howard | 360/327.32 |
| 5,315,468 A | * | 5/1994 | Lin et al. | 360/327.32 |
| 5,436,778 A | * | 7/1995 | Lin et al. | 360/327.32 |
| 5,452,163 A | * | 9/1995 | Coffey et al. | 360/324 |
| 5,654,850 A | * | 8/1997 | Ganapathi et al. | 360/235.2 |
| 5,956,215 A | * | 9/1999 | Schmalhorst et al. | 360/315 |
| 6,392,922 B1 | * | 5/2002 | Liu et al. | 365/158 |

FOREIGN PATENT DOCUMENTS

| JP | 2001196659 A | * | 7/2001 |
|---|---|---|---|

* cited by examiner

*Primary Examiner*—Allen Cao
(74) *Attorney, Agent, or Firm*—Kinney & Lange, P.A.

(57) ABSTRACT

A magnetic data storage and retrieval system has a bottom shield, a first half gap positioned on the bottom shield, a sensor layer positioned on the first half gap, a second half gap positioned on the sensor layer; and a top shield positioned on the second half gap. The sensor layer includes a magnetoresistive sensor having sidewalls and a barrier surrounding and in direct contact with the sidewalls of the magnetoresistive sensor.

20 Claims, 8 Drawing Sheets

EDGE BARRIER TO PREVENT SPIN VALVE SENSOR CORROSION AND IMPROVE LONG TERM RELIABILITY

CROSS-REFERENCE TO RELATED APPLICATION(S)

This Application claims priority from provisional application No. 60/162,612, filed Oct. 28, 1999 for "Edge Barrier to Prevent Spin Valve Sensor Corrosion and Improve Long Term Reliability" of Hong Wang, Robbee L. Grimm, Matthew T. Johnson, John P. Spangler, Craig A. Ballentine, Qing He, Steven C. Riemer and Brian J. Daniels.

BACKGROUND OF THE INVENTION

The present invention relates generally to magnetic data storage and retrieval systems. More particularly, the present invention relates to an edge barrier for prevention of spin valve sensor corrosion and improvement of spin valve sensor reliability.

A transducing head of a magnetic data storage and retrieval system typically includes a magnetoresistive reader portion for retrieving magnetic data stored on magnetic media. The reader is typically formed of several layers which include a magnetoresistive (MR) sensor positioned between two gap layers, which are in turn positioned between two shield layers. The MR sensor may be any one of a plurality of MR-type sensors, including, but not limited to, AMR, GMR, VGMR, spin valve and spin tunneling sensors.

During fabrication of the transducing head, the MR sensor is subjected to many processing steps. Current contacts and biasing layers are commonly deposited adjacent to the MR sensor after the MR sensor is shaped, but before the second half gap is deposited. The formation of the contacts and biasing layers, as well as the patterning of the MR sensor itself, subjects the MR sensor to a harsh environment that may result in corrosion of the MR sensor. This is particularly true of a multi-layered sensor such as a spin valve sensor. Multi-layered sensors generally are formed of multiple materials, several of which very easily corrode. Since an MR sensor relies on the existence of each of its layers to operate properly, corrosion of any of its layers will result in the sensor having a reduced amplitude, a distorted signal output, decreased stability, and/or increased noise.

Accordingly, there is therefore a need for a means of preventing corrosion of the sensor in a transducing head.

BRIEF SUMMARY OF THE INVENTION

The present invention is an edge barrier of corrosion-resistant material for preventing corrosion of a sensor of a transducing head during fabrication of the transducing head. In a transducing head of a magnetic data storage and retrieval system in accord with the present invention, the transducing head has a bottom shield, a first half gap positioned on the bottom shield, a sensor layer positioned on the first half gap, a second half gap positioned on the sensor layer; and a top shield positioned on the second half gap.

The sensor layer includes a magnetoresistive sensor having sidewalls and a barrier surrounding and in direct contact with the sidewalls of the magnetoresistive sensor. An acute angle formed between the sidewalls of the magnetoresistive sensor and the first halfgap preferably is in the range of about 40° to about 90°. The barrier is preferably formed of a corrosion-resistant material such as Ta, TaN, W, Cr, $Al_2O_3$, $SiO_2$, or NiFe.

DETAILED DESCRIPTION

Figure 1:
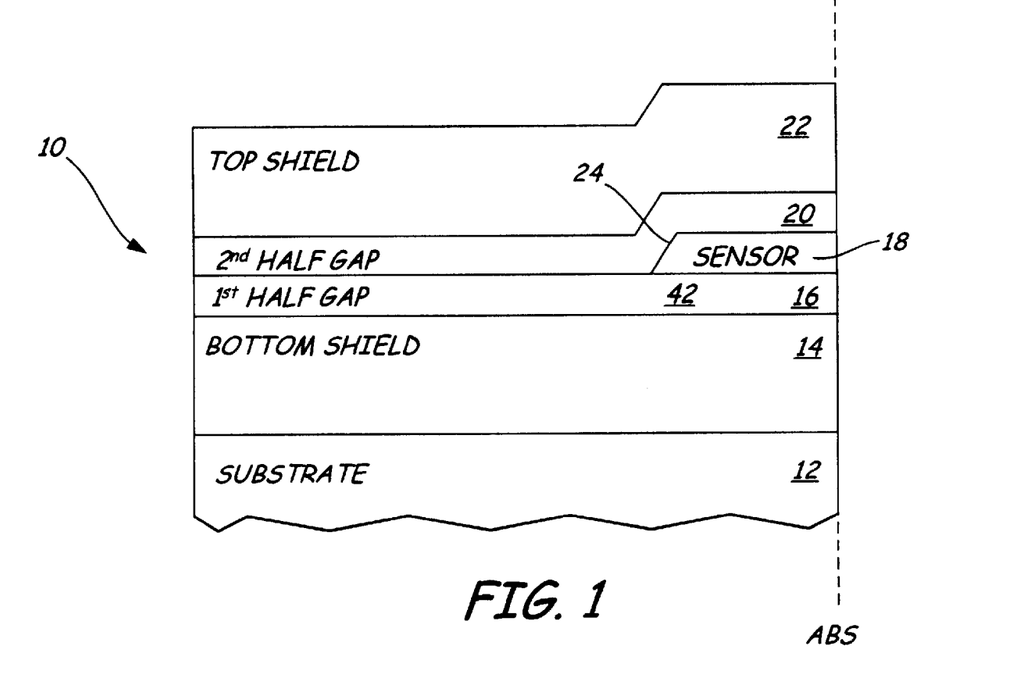
FIG. 1 is a cross-sectional view of a magnetic transducing head.

FIG. 1 is a cross-sectional view of magnetic transducing head 10 having substrate 12, bottom shield 14, first half gap 16, sensor 18, second half gap 20, and top shield 22. Sensor 18 is positioned between first half gap 16 and second half gap 20 at an air bearing surface (ABS) of transducing head 10. First and second half gaps 16 and 18 are positioned between bottom shield 14 and top shield 22.

Bottom and top shields 14 and 22 ensure that sensor 18 reads only the information stored directly beneath it on a specific track of the magnetic medium or disc (not shown in FIG. 1) by absorbing any stray magnetic fields emanating from the adjacent tracks and transitions. First and second half gaps 16 and 20 serve to isolate sensor 18 from bottom and top shields 14 and 22. Gaps 16 and 20 are typically formed of insulating materials. Sensor 18 may be any type of magnetoresistive (MR) sensor, including, but not limited to, AMR, GMR, VGMR, spin valve and spin tunneling sensors.

During fabrication of transducing head 10, several processing steps occur after the shaping of sensor 18 and before the deposition of second half gap 20. These processing steps include the deposition of biasing layers and current contacts. During these intermediate processing steps, back edge 24 of sensor 18 is exposed to an environment that may harm sensor 18, potentially resulting in corrosion of sensor 18.

Figures 2, 3:
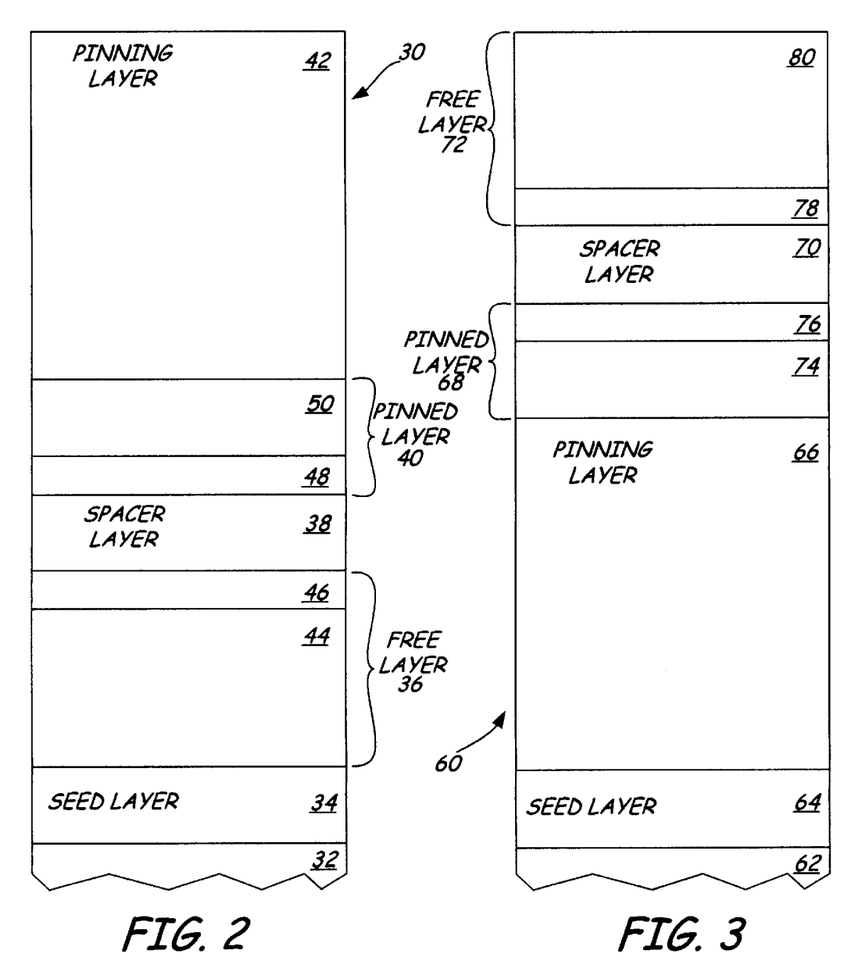
FIG. 2 is a layer diagram of a typical top spin valve sensor.
FIG. 3 is a layer diagram of a typical bottom spin valve sensor.

The likelihood of sensor corrosion during fabrication increases when sensor 18 is a multi-layered sensor such as a spin valve sensor. FIG. 2 is a layer diagram of typical top spin valve 30 having substrate 32, seed layer 34, free layer 36, spacer layer 38, pinned layer 40 and pinning layer 42. In spin valve sensor 30, a magnetization direction of pinned layer 42 is fixed in a predetermined direction, generally normal to an air bearing surface of spin valve 30, while a magnetization direction of free layer 36 rotates freely in response to external magnetic fields. An easy axis of free layer 36 is typically set normal to the magnetization direction of pinned layer 42. The resistance of spin valve sensor 30 varies as a function of an angle formed between the magnetization direction of free layer 36 and the magnetization direction of pinned layer 42.

Seed layer 34 is typically deposited on substrate 32 to promote the texture and enhance the grain growth of each of the layers subsequently grown on top of it. The seed layer material is chosen such that its atomic structure, or arrangement, corresponds with the preferred crystallographic and magnetic orientations of top spin valve 30. Seed layer 34 is typically a thin layer formed of a nonmagnetic material such as Ta, TaN, NiFeCr, or a TaN/NiFeCr bilayer.

Free layer 36 is positioned on seed layer 34. Each of free layer 36 and pinned layer 40 are formed of ferromagnetic materials such as NiFe or CoFe. Additionally, each of free layer 36 and pinned layer 40 may also be formed of multiple layers. As shown in FIG. 2, free layer 36 is a bilayer structure consisting of first ferromagnetic layer 44 formed of NiFe and second ferromagnetic layer 46 formed of CoFe. Similarly, pinned layer 40 is a bilayer structure consisting of first ferromagnetic layer 48 formed of CoFe and second ferromagnetic layer 50 formed of NiFe. Pinned layer 40 may also be a CoFe/Ru/CoFe trilayer structure.

Spacer layer 38 separates pinned layer 40 from free layer 36, and is typically formed of a nonmagnetic material such as copper, or a copper alloy.

Pinning layer 42 is exchange coupled to pinned layer 40 to fix the magnetization of pinned layer 40 in a predetermined direction. Pinning layer 42 is typically formed of an antiferromagnetic material such as NiMn, NiMnCr, IrMn, PtMn, PdMn, PdPtMn, CrMnPt, CrMnCu, CrMnPd, NiO or PtRuMn. Pinning layer 42 may be eliminated from spin valve sensor 30 by using self-saturation to pin the magnetization of pinned layer 40.

FIG. 3 is a layer diagram of typical bottom spin valve sensor 60 having substrate 62, seed layer 64, pinning layer 66, pinned layer 68, spacer layer 70 and free layer 72. Bottom spin valve sensor 60 differs from top spin valve sensor 30 in the order in which its layers are deposited. In bottom spin valve 60, pinning layer 66 is positioned on seed layer 64, while in top spin valve sensor 30, free layer 36 is positioned on seed layer 34.

Seed layer 64 is deposited on substrate 62, and is typically formed of a nonmagnetic material such as Ta, TaN, NiFeCr or a TaN/NiFeCr bilayer.

Pinning layer 66 is deposited on seed layer 64 and is typically formed of an antiferromagnetic material such as NiMn, NiMnCr, IrMn, PtMn, PdMn, PdPtMn, CrMnPt, CrMnCu, CrMnPd, NiO or PtRuMn. As described in reference to spin valve sensor 30, pinning layer 66 may be eliminated from spin valve sensor 60 by using self-saturation to pin the magnetization of pinned layer 68.

Pinned layer 68 is typically exchanged coupled with pinning layer 66 to fix the magnetization direction of pinned layer 68. Each of free layer 72 and pinned layer 68 are formed of either single or multiple layers of ferromagnetic materials such as NiFe or CoFe. As shown in FIG. 3, pinned layer 68 is a bilayer structure consisting of first ferromagnetic layer 74 formed of NiFe and second ferromagnetic layer 76 formed of CoFe. Similarly, free layer 72 is a bilayer structure consisting of first ferromagnetic layer 78 formed of CoFe and second ferromagnetic layer 80 formed of NiFe. Pinned layer 68 may also be a CoFe/Ru/CoFe trilayer structure.

Spacer layer 70 separates pinned layer 68 from free layer 72, and is typically formed of a nonmagnetic material such as copper, or a copper alloy.

As described above, multi-layer sensor 18 is particularly vulnerable to corrosion during fabrication of transducing head 10. Until second half gap 20 is deposited to seal sensor 18, sensor 18 is exposed to several ashing and/or chemical stripping processes, rinse and dry steps, and vapor condensation from the surrounding environment. It is well established that several of the materials used in forming spin valve sensors, such as those described above for the sensors shown in FIGS. 2 and 3, corrode very easily. Corrosion is likely to occur when two materials with different electrochemical potentials are connected to each other in an electrolytic environment.

Figure 4:
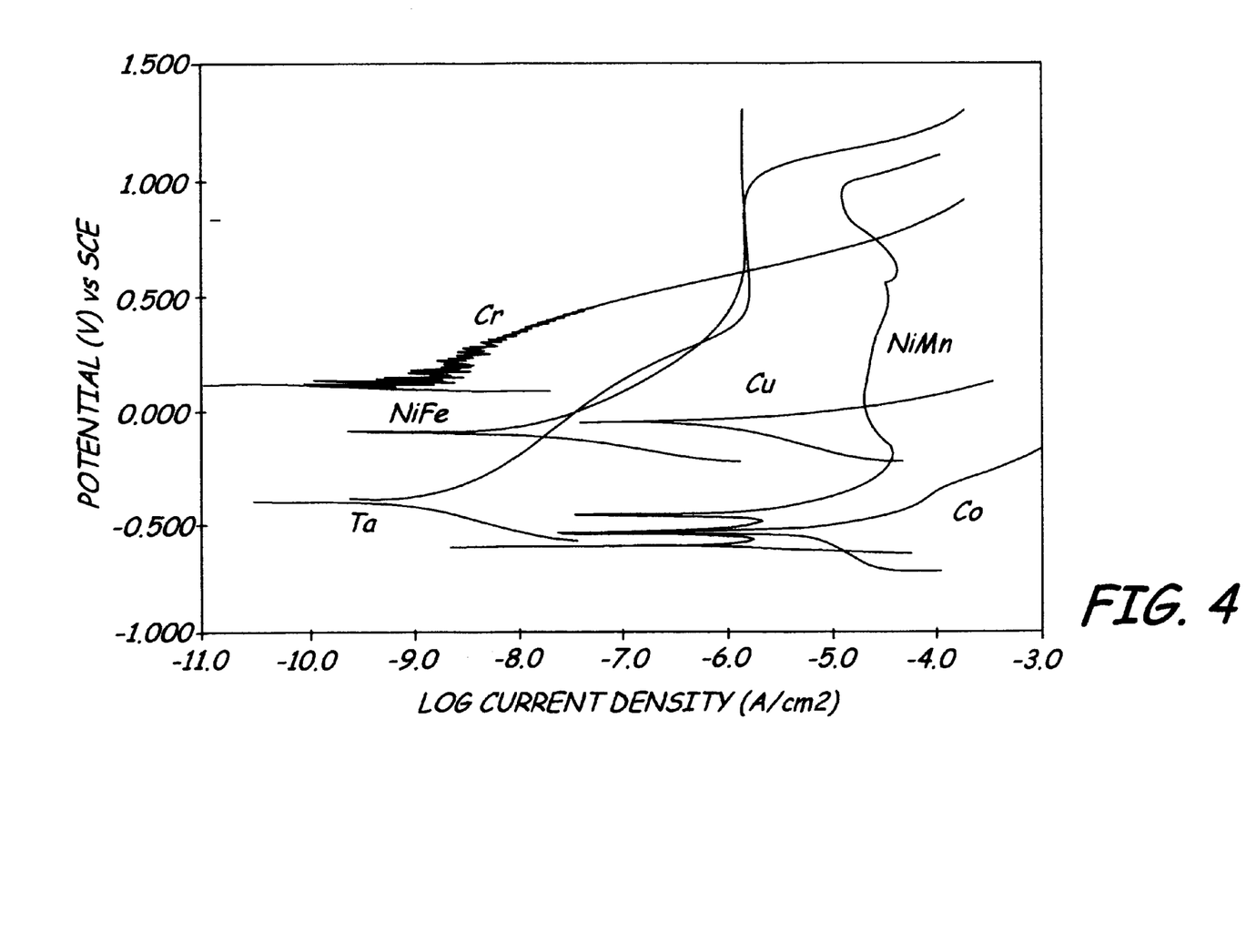
FIG. 4 is a graph of potentiodynamic polarization scans (0.5 mV/sec) for typical spin valve materials in a phthalate buffer at 0.01 M and pH of 6.

FIG. 4 is a graph of potentiodynamic polarization scans (0.5 mV/sec) for typical spin valve materials in a phthalate buffer at 0.01 M and pH of 6. In this mild solution, FIG. 4 illustrates that Cu, Co and NiMn are each very vulnerable to corrosion in comparison to NiFe, Ta and Cr. In the harsher environment that those materials are subjected to during fabrication of transducing head 10, corrosion is highly likely. Since spin valve sensor 18 relies on the existence of each of its layers to operate properly, corrosion of any of those layers will result in a sensor having a reduced amplitude, a distorted signal output, decreased stability, and increased noise.

There is therefore a need for a means of preventing corrosion of sensor 18. The present invention is a barrier that protects sensor 18 during subsequent processing steps from the harsh environment. The barrier is placed around sensor 18 immediately after sensor 18 has been shaped to prevent sensor 18 from corroding due to the harsh environment before second half gap 20 is deposited. Preferably, the barrier is formed of a corrosion-resist material.

Figure 5A:
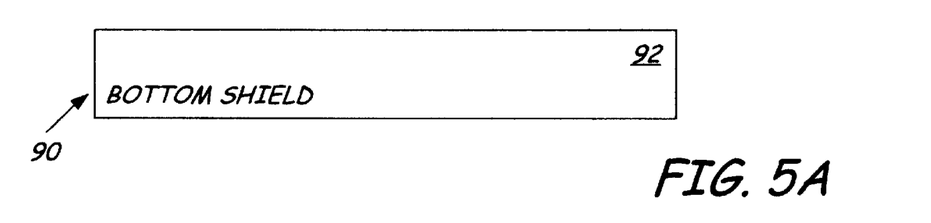
FIGS. 5A–5H are cross-sectional drawings illustrating the formation of a magnetic transducing head in accord with the present invention.
Figure 5B:
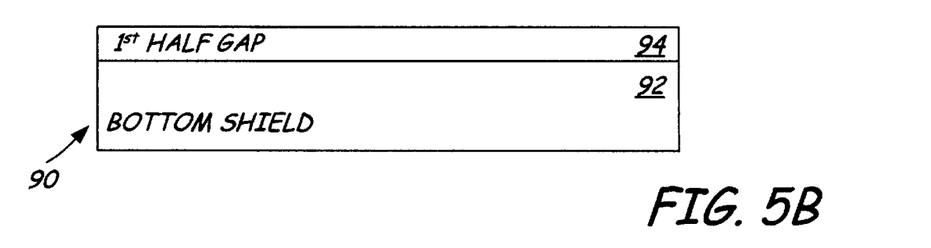
Figure 5C:
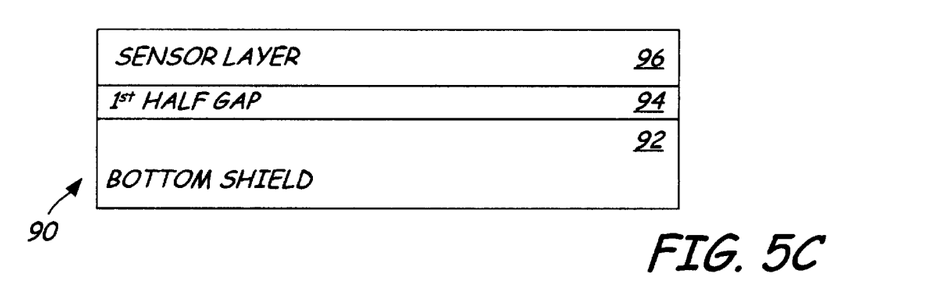

FIGS. 5A–5H are cross-sectional drawings illustrating a method of forming of magnetic transducing head 90 in accord with the present invention. FIG. 5A is a cross-sectional view of transducing head 90 after bottom shield 92 has been deposited on a substrate (not shown in FIGS. 5A–5H). FIG. 5B shows transducing head 90 after deposition of first half gap 94 on bottom shield 92. FIG. 5C is a view showing deposition of sensor layer 96 over first half gap 94. At this stage, sensor layer 96 has not yet been shaped into its final sensor form. Sensor layer 96 may be formed of a plurality of layers to form any of a plurality of MR-type sensors.

Figure 5D:
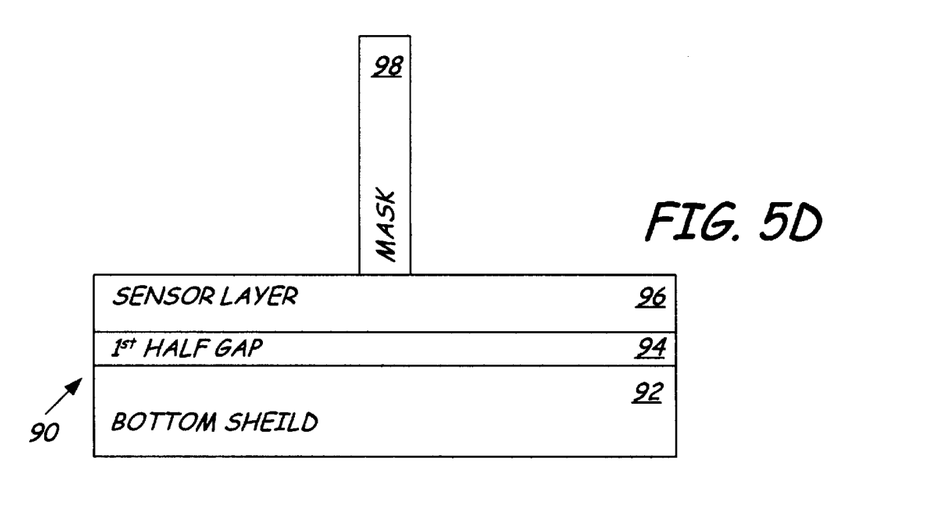
Figure 5E:
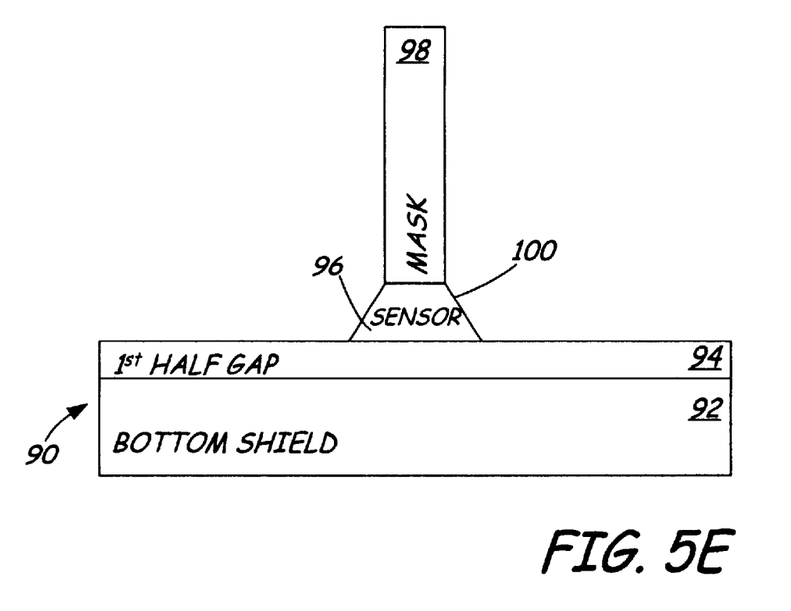

FIG. 5D is a cross-sectional view of transducing head 90 after photo-resist 98 has been deposited onto a central region of sensor layer 96 to pattern sensor layer 96. Photo-resist mask or hard mask 98 is defined by lithography. The pattern of photo-resist mask 98 is then transferred to sensor layer 96, as shown in FIG. 5E, by selectively removing portions of sensor layer 96 not covered by photo-resist mask 98. The removal of the uncovered portions of sensor layer 96 is preferably implemented by an ion milling technique having a near normal incidence angle so that sidewalls 100 of sensor 96 are as vertical as possible. Preferably, an acute angle formed between sidewalls 100 of sensor 96 and first half gap 94 is in the range of about 40° to about 90°.

Figure 5F:
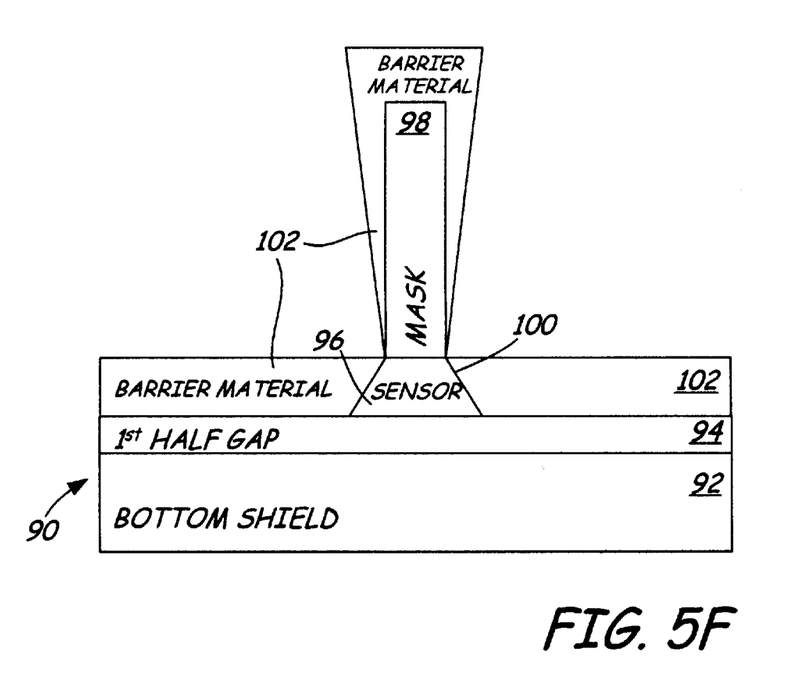

FIG. 5F illustrates transducing head 90 after barrier material 102 has been deposited over first half gap 94, sidewalls 100 of sensor 96 and mask 98. Barrier material 102 is preferably a corrosion-resistant material, such as Ta, TaN, W, Cr, $Al_2O_3$, or $SiO_2$. Preferably, barrier material 102 is deposited by isotropic sputter deposition. To ensure a conformal coating of barrier material 102 over sidewalls 100 of sensor 96, the deposition of barrier material 102 preferably is performed with a low power and a high gas pressure sputter deposition.

Figure 5G:
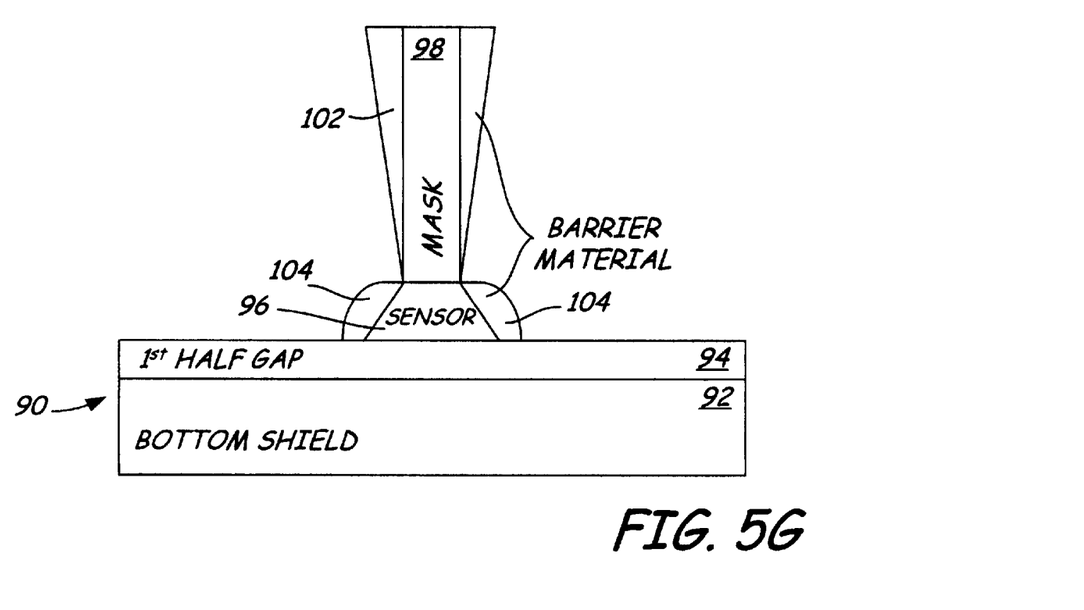

FIG. 5G is a cross-sectional view of transducing head 90 after removal of excess barrier material 102 over first half gap 94. Barrier material 102 is left covering sensor 96 to form barrier 104 over sidewalls 100 of sensor 96. The thickness of barrier material 102 over sidewalls 100 of sensor 96 is preferably in the range of about 5 Angstroms to about 1000 Angstroms.

The removal of barrier material 102 is preferably performed using a collimated, or anisotropic, ion milling process having a near vertical incidence angle. The ion mill rate at any given location is inversely proportional to the cosine of the angle between the ion beam and the local tangent of the surface. For an ion beam with a near-normal incidence angle, the mill rate on top of photo-resist mask 98 and on outside edges of first half gap 94 will be high, while the mill rate at sidewalls 100 of sensor 96 will be very low. As a result of the ion mill rate differential, barrier material 102 is left over sidewalls 100 of sensor 96, while barrier material 102 is cleared nearly everywhere else on sensor 96, thereby forming barrier 104. The anisotropic ion milling technique may be any of a plurality of ion milling techniques, such as ion milling, reactive ion milling, chemically assisted ion milling and reactive ion etching.

Figure 5H:
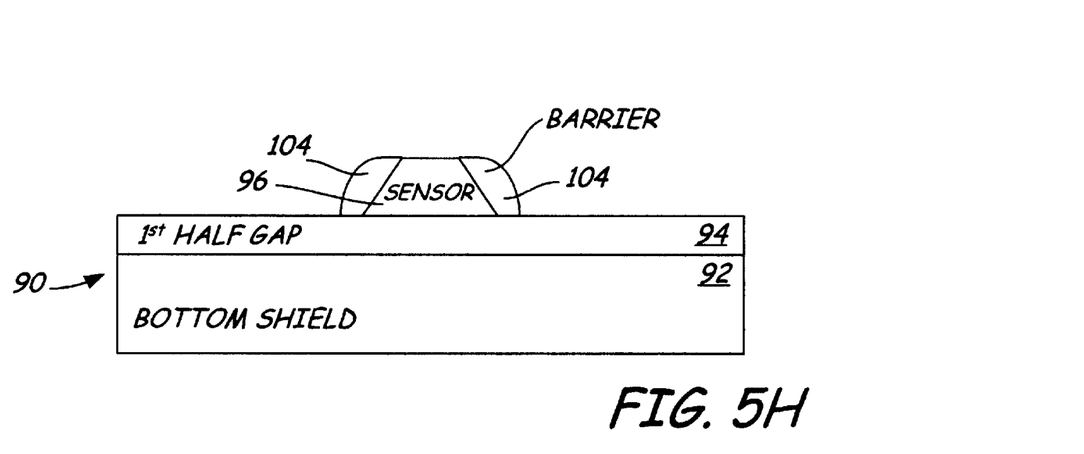

FIG. 5H is a cross-sectional view of transducing head 90 after photo-resist mask 98, as well as excess barrier material 102 still adhering tb photo-resist mask 98, has been removed. Mask 98 may be removed by known methods, such as ashing or chemical stripping. After photo resist mask 98 is removed, transducing head 90 is prepared for the deposition of contacts and biasing layers, followed by the deposition of a second half gap over sensor 96. Finally, a top shield is deposited over the second half gap. As these final steps are well known in the art of transducing head design, they are not illustrated in figures.

Figure 6:
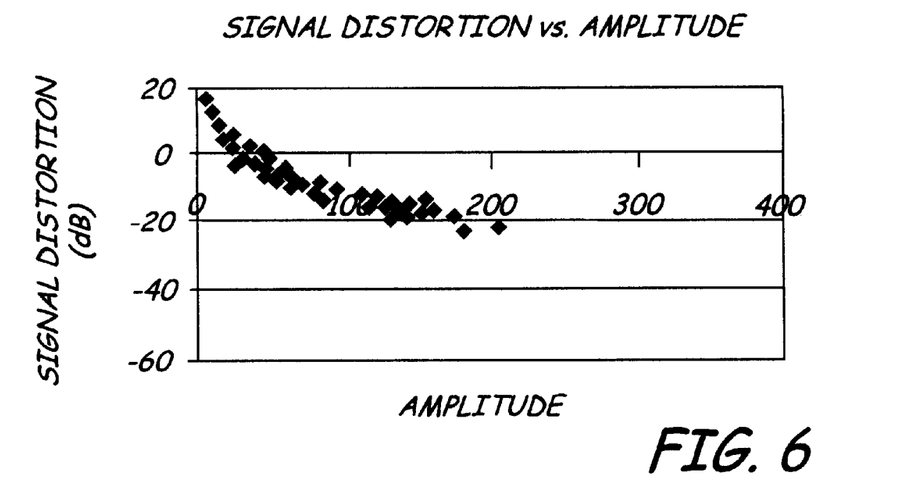
FIG. 6 is a graph correlating signal distortion and signal amplitude of prior art transducing heads.
Figure 7:
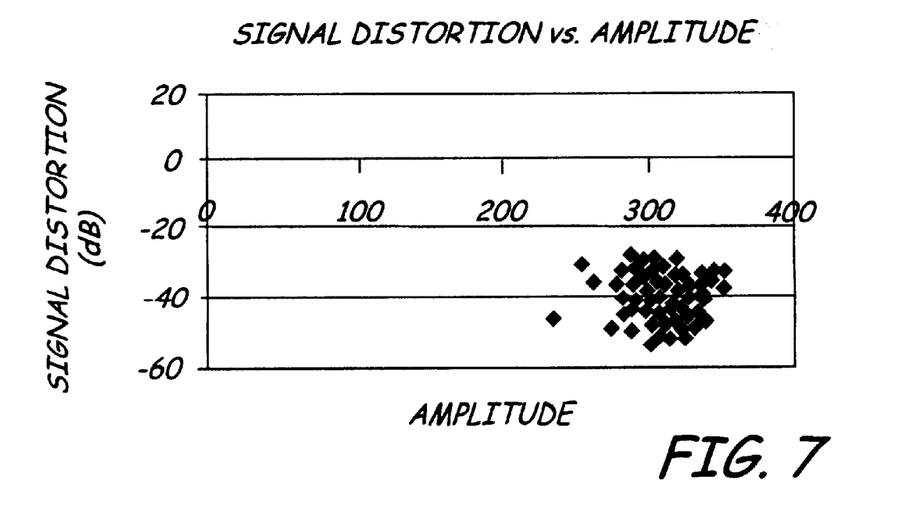
FIG. 7 is a graph correlating signal distortion and signal amplitude of transducing heads with the sensor barrier of the present invention.

FIG. 6 is a graph correlating signal distortion and signal amplitude of prior art transducing heads without a sensor barrier, while FIG. 7 is a similar graph of transducing heads with the sensor barrier of the present invention. The sample transducing heads used in generating data for the graphs of both FIG. 6 and FIG. 7, have a top spin valve sensor having a Co/Ru/Co trilayer pinned layer and a NiMn pinning layer. As discussed above, Co and NiMn are both highly sensitive to corrosion. As shown in FIG. 6, there is substantial corrosion of the prior art transducing heads. The correlation in FIG. 7 shows no signs of corrosion when compared to the correlation shown in FIG. 6. The comparison of FIGS. 6 and 7 shows that the average amplitude of a corrosion-free sensor is 130% higher than that of a corroded sensor and the signal distortion is 25 dB better.

Figure 8:
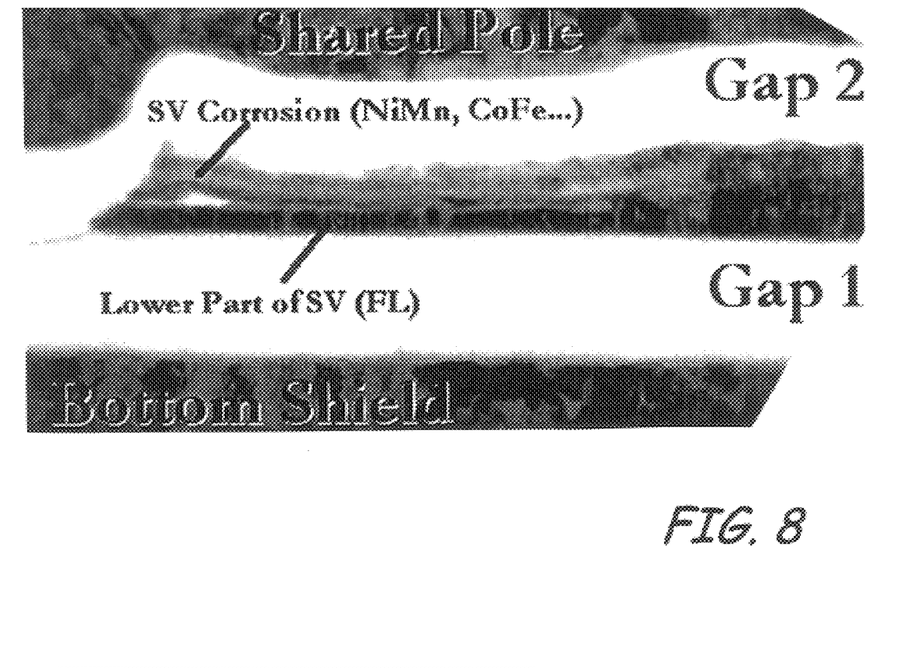
FIG. 8 is a cross sectional TEM image of a prior art transducing head.

FIG. 8 is a cross sectional TEM image of a prior art transducing head. Shown in FIG. 8 are portions of a bottom shield, a first gap (gap 1), a spin valve sensor (SV), a second gap (gap 2) and a shared pole of the transducing head. The spin valve sensor has a NiMn pinning layer adjacent the second gap. As FIG. 8 illustrates, a substantial portion of the spin valve sensor, particularly the NiMn pinning layer, has corroded during the fabrication of the prior art transducing head.

Figure 9:
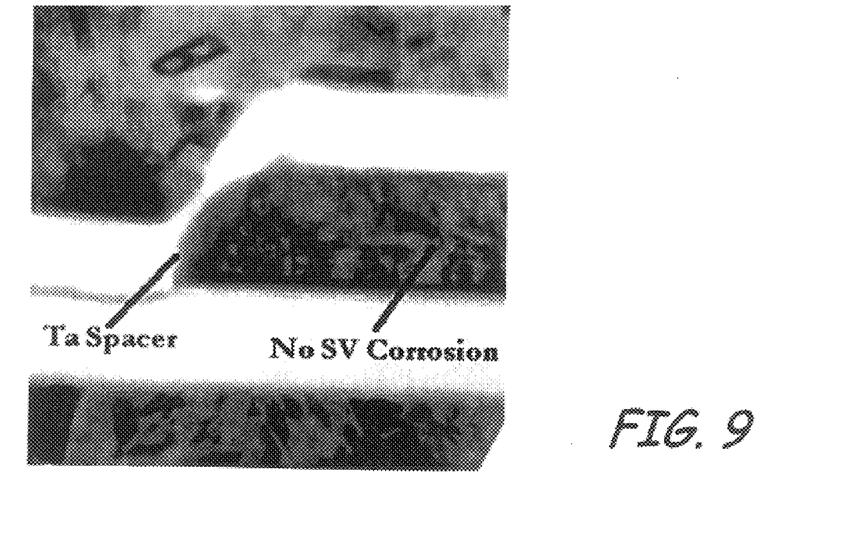
FIG. 9 is a cross sectional TEM image of a transducing head with the sensor barrier of the present invention.

FIG. 9 is a cross sectional TEM image of a transducing head with the sensor barrier of the present invention. Shown in FIG. 9 are portions of a bottom shield, a first gap. a spin valve sensor (SV), a Ta barrier layer, a second gap and a shared pole. As FIG. 9 illustrates, the Ta barrier layer prevents any corrosion of the spin valve sensor.

Although the present invention has been described with reference to preferred embodiments, workers skilled in the art will recognize that changes may be made in form and detail without departing from the spirit and scope of the invention.

What is claimed is:

1. A magnetic transducing head comprising:

a magnetoresistive sensor having an air bearing surface, a top surface substantially normal to the air bearing surface, a bottom surface substantially parallel to the top surface, and sidewalls connecting the top and bottom surfaces, the magnetoresistive sensor being formed of a plurality of layers, each of the plurality of layers being substantially parallel to the top surface and being exposed at the sidewalls; and barrier means adjacent the sidewalls of the magnetoresistive sensor for minimizing corrosion of each of the plurality of layers of the magnetoresistive sensor during fabrication of the transducing head.

2. A magnetic data storage and retrieval system comprising:

a bottom shield;

a first half gap positioned on the bottom shield;

a sensor layer positioned on the first half gap, the sensor layer comprising a magnetoresistive sensor formed of a plurality of layers, the magnetoresistive sensor having sidewalls at which each of the plurality of layers of the magnetoresistive sensor is exposed and a barrier covering each of the plurality of layers of the magnetoresistive sensor at the sidewalls of the magnetoresistive sensor;

a second half gap positioned on the sensor layer; and a top shield positioned on the second half gap.

3. The magnetic data storage and retrieval system of claim 2 wherein the barrier has a thickness in the range of about 5 Angstroms to about 1000 Angstroms.

4. The magnetic data storage and retrieval system of claim 2 wherein the barrier is formed of a corrosion-resistant material.

5. The magnetic data storage and retrieval system of claim 2 wherein the barrier is formed of a material selected from the group consisting of Ta, TaN, Cr, W, $Al_2O_3$ and $SiO_2$.

6. The magnetic data storage and retrieval system of claim 2 wherein the magnetoresistive sensor further comprises a bottom surface adjacent the first half gap, and wherein an acute angle formed between the sidewalls of the magnetoresistive sensor and the bottom surface of the magnetoresistive sensor is in the range of about 40° to about 90°.

7. The magnetic data storage and retrieval system of claim 2 wherein the magnetoresistive sensor is a multi-layered structure comprising an antiferromagnetic layer.

8. The magnetic data storage and retrieval system of claim 7 wherein the antiferromagnetic layer is formed of a material selected from the group consisting of NiMn, NiMnCr, IrMn, PtMn, PdMn, PdPtMn, CrMnPt, CrMnCu, CrMnPd, NiO and PtRuMn.

9. A method for forming a transducing head comprising:

depositing a bottom shield;

depositing a first half gap onto the bottom shield;

depositing a magnetoresistive sensor onto the first half gap, the magnetoresistive sensor having an air bearing surface, a bottom surface adjacent the first half gap and substantially normal to the air bearing surface, and a top surface substantially parallel to the bottom surface;

patterning a mask on a central region of the magnetoresistive sensor;

selectively removing the magnetoresistive sensor in the regions not covered by the mask, thereby exposing end regions of the first half gap and sidewalls of the magnetoresistive sensor, the sidewalls of the magnetoresistive sensor connecting the top and bottom surfaces of the magnetoresistive sensor;

depositing a barrier material onto the exposed end regions of the first half gap, the sidewalls of the magnetoresistive sensor, and the mask;

selectively removing the barrier material over the first half gap so as to leave the sidewalls of the magnetoresistive sensor covered by a barrier formed of the barrier material;

removing the mask;

depositing a second half gap onto the magnetoresistive sensor; and depositing a top shield onto the second half gap.

10. The method of claim 9 wherein the step of selectively removing the magnetoresistive sensor in the regions not covered by the mask is implemented by an ion milling technique having a near-normal incidence angle.

11. The method of claim 9 wherein the step of depositing a barrier material is implemented through use of isotropic sputter deposition.

12. The method of claim 9 wherein the step of depositing a barrier material is implemented through use of an isotropic sputter deposition technique selected from the group consisting of physical vapor deposition and chemical vapor deposition.

13. The method of claim 9 wherein the step of selectively removing the barrier material is implemented through use of an ion milling technique having a near-normal incidence angle.

14. The method of claim 9 wherein the step of selectively removing the barrier material is implemented through use of anisotropic ion milling.

15. The method of claim 9 wherein the step of selectively removing the barrier material is implemented through use of an anisotropic ion milling technique selected from the group consisting of ion milling, reactive ion milling, chemically assisted ion milling and reactive ion etching.

16. The method of claim 9 wherein the barrier has a thickness in the range of about 5 Angstroms to about 1000 Angstroms.

17. The method of claim 9 wherein the barrier material is a corrosion-resistant material.

18. The method of claim 9 wherein the barrier material is a material selected from the group consisting of Ta, TaN, Cr, W, $Al_2O_3$ and $SO_2$.

19. The method of claim 9 wherein an acute angle formed between the sidewalls of the magnetoresistive sensor and the first half gap is in the range of about 40° to about 90°.

20. The method of claim 9 wherein the magnetoresistive sensor is a multi-layered structure comprising an antiferromagnetic layer.

* * * * *

UNITED STATES PATENT AND TRADEMARK OFFICE
CERTIFICATE OF CORRECTION

PATENT NO. : 6,600,637 B1 Page 1 of 1
DATED : July 29, 2003
INVENTOR(S) : Hong Wang et al.

It is certified that error appears in the above-identified patent and that said Letters Patent is hereby corrected as shown below:

Title page,
Item [73], Assignee, delete ", L.L.C.,", insert -- LLC --

Column 5,
Line 22, delete "tb", insert -- to --

Column 8,
Line 20, delete "$SO_2$", insert -- $SiO_2$ --

Signed and Sealed this

Fourteenth Day of October, 2003

JAMES E. ROGAN
*Director of the United States Patent and Trademark Office*